United States Patent Office 3,356,939
Patented Dec. 5, 1967

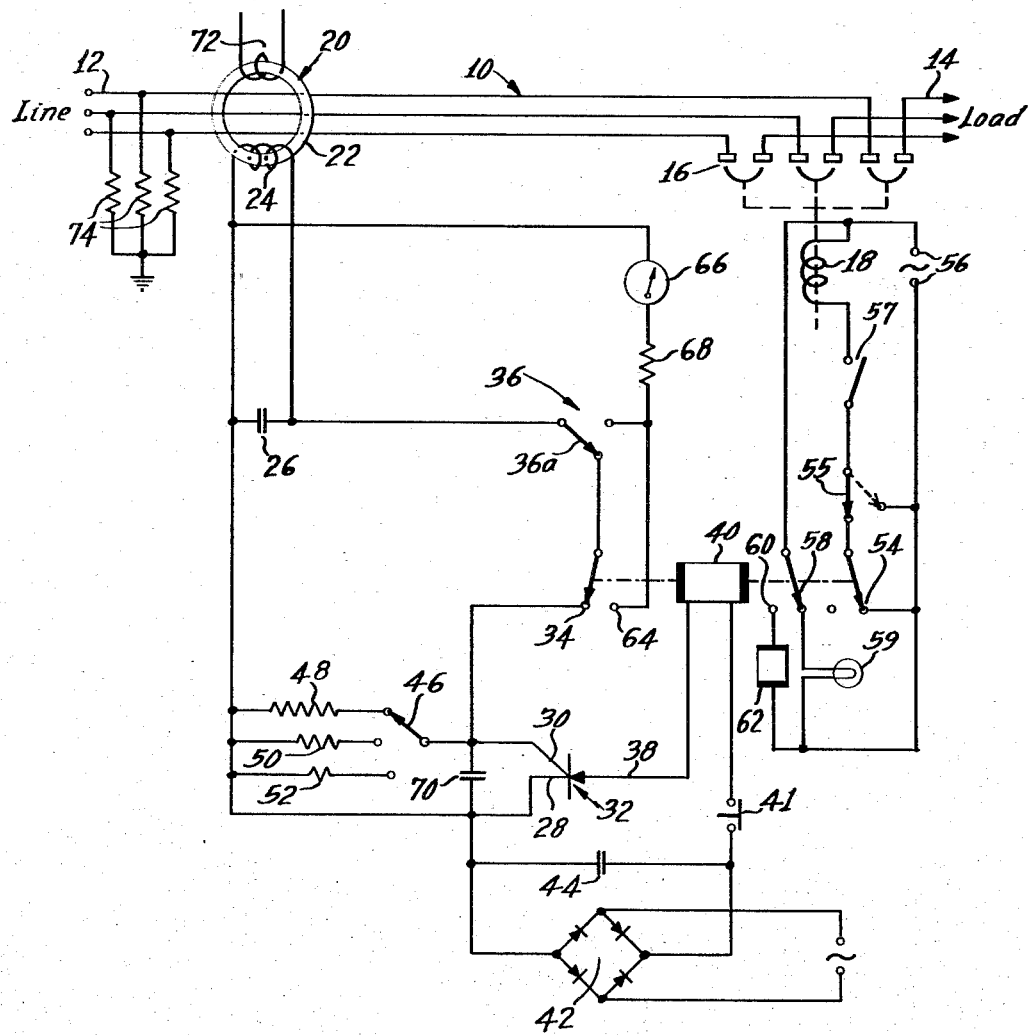

3,356,939
GROUND LEAKAGE DETECTION APPARATUS FOR UNGROUNDED SYSTEMS INCLUDING TOROIDAL CORE DETECTOR MEANS
Robert A. Stevenson, Granby, Quebec, Canada, assignor to Federal Pacific Electric Company, a corporation of Delaware
Filed Mar. 25, 1964, Ser. No. 354,730
3 Claims. (Cl. 324—51)

The present invention relates to apparatus for detection of ground leakage in electrical power distribution, and in its different aspects the invention involves both the detection of faults in a particular load such as a motor as well as detection of ground faults in a distribution power line that may extend to many loads.

In one aspect of this invention the apparatus is employed for the detection of ground faults in a distribution system that is ungrounded, for example, an ungrounded three-phase system. Heretofore a Y-connected group of lamps or other signalling devices with their junction grounded have been connected at their three-phase terminals (through suitable dropping resistors or potential transformers) to the three-phase wires of the system to be monitored. In the event that any one of the lines should develop a ground fault, then one of the lamps would go out while the other two would remain on. This detection system is voltage responsive. The response is the same almost without regard to the position of the fault in relation to the point at which the fault detector is connected. A distribution system may have a main line and a number of branches, but the foregoing ground-fault detector is ordinarily incapable of identifying the location of the fault among the branches.

A feature of the present invention resides in replacing voltage sensing by current sensing for detecting ground leakage in an essentially ungrounded distribution system. The use of current detection as a means of revealing ground faults in basically ungrounded systems provides a far more satisfactory fault-detection means since it can be used at various locations to identify the branch line that has the ground fault and the point along the line at which the fault is located.

In practical application of this feature of the invention, a Y-connected network of moderately high impedance is located at a supply point in a three-phase distribution system, and the junction of the Y-network is grounded. A zero phase sequence transformer forming part of a ground leakage detector is applied at any desired point in the system between the supply point and the part of the system that is to be monitored for a ground fault. The detector will then signal the occurrence of a ground fault at a point in the line farther from the Y-network than the location of the detector.

Another object of the invention resides in the provision of an improved ground leakage detector which can be made responsive to relatively weak ground leakage currents without, however, rendering the apparatus so sensitive as to be responsive to sudden changes in the load, even unbalanced changes in load such as occur when large loads are switched on to the power line that is monitored by a ground leakage detector. One way of suppressing response to switching transients might be to desensitize the ground leakage detector. This is avoided pursuant to a feature of this invention which retains a desired high level of sensitivity, and nonetheless is prominently insensitive to switching transients.

In achieving the foregoing objects, the particular embodiment of the invention described in detail below utilizes a zero phase sequence transformer, in the form of a toroidal wound core on which there is a secondary winding. This transformer is in the nature of a current transformer whose primary winding is the group of wires that connect the source of power to the load. The excitation of the zero phase-sequence transformer is the unbalanced current resulting from ground leakage. The secondary winding has a load proportioned to provide a desired level of sensitivity. A silicon-controlled rectifier is utilized in this embodiment in detecting output levels above a threshold value that is established as representing significant or hazardous ground-leakage current. The silicon controlled rectifier has its output circuit energized by a direct-current supply so that, once it is triggered, it holds its triggered condition thereby to retain evidence of an intermittent ground fault. Other holding means can be used for this purpose, as by means of a latching relay or a relay with a self-holding circuit, but the silicon controlled rectifier has distinct advantages.

The input to the detecting element represented by the silicon-controlled rectifier is resonated at the power frequency. A resonating capacitor is connected across the secondary winding of the zero phase sequence transformer. As a result of the resonance, the system is relatively non-responsive to switching transients without sacrificing high sensitivity in response to low levels of persistent ground leakage conditions. Moreover, where the capacitor is used to resonate the secondary of the zero phase sequence transformer, it becomes possible to use a relatively small transformer having a minimum of core cross section and a proportionally small secondary winding. The bulk and the cost of the transformer are minimized.

Further features of the invention relate to details of ground leakage detectors. Pursuant to one such feature, a test primary winding is provided on the zero phase sequence transformer for calibration, by "primary injection" of a known value of current that simulates a fault condition. Another feature of the invention involves the use of a meter which indicates the magnitude of the fault when a fault develops but which meter is normally out of the circuit and is thus not continuously subjected to wear in responding to minor levels of signal input below fault levels. Still further, the measurement circuit involves a relay that is responsive to the detection of a ground fault by the silicon-controlled rectifier (or a substitute fault-level responsive switching device), the relay having an energizing source including a capacitor whose initial charge is available for rapid and positive pull-in of the relay but wherein the power source for energizing the relay is only capable of providing a lower safe steady-state energization level to hold the relay in continuously without causing overheating.

The nature of the invention, including the foregoing and other objects and novel features will be more fully appreciated from the following detailed description of the preferred embodiment of the invention, which is shown in the accompanying drawings.

In the drawings, the single figure is a wiring diagram of the illustrative embodiment.

In the drawing, a three-phase distribution system including conductors 10 connect the terminals 12 of an ungrounded three-phase supply to load terminals 14. A contactor 16 that is closed by energizing solenoid 18 is provided for interrupting the supply of current to the load.

A zero phase sequence transformer 20 includes a toroidal core that encircles all of the conductors 10, and a secondary winding 24 is provided, in which there is no induced current so long as there is no unbalance of flux produced by the currents carried by conductors 10. In the event of even slight ground leakage, there is a diversion of some of the current in one or more of the conductors 10. The leakage current bypasses a conductor extending through transformer 20, and an output current is developed in secondary winding 24. Excessive ground leakage constitutes a fault that is to be detected. A certain amount of flux unbalance also occurs momentarily, at the time when a load is switched onto the line, as by contactor 16. It is important that the sensitivity of the ground leakage detector should not be so high as to respond to a switching transient as if it were a ground fault.

A capacitor 26 is connected across secondary winding 24, this capacitor and winding being proportioned to form a parallel resonant circuit at the power frequency of the alternating current line. This is an important feature of the invention, and is more fully discussed below.

Ground-fault signalling apparatus is connected to the parallel-connected winding 24 and capacitor 26, the whole constituting a ground fault detector. The signalling apparatus includes input electrode or cathode 28 and control electrode or gate 30 of a so-called silicon-controlled rectifier 32. Electrode 28 is directly connected to one terminal of winding 24 and capacitor 26, while electrode 30 is connected to the opposite terminal of winding 24 and capacitor 26 by way of a normally closed pair of relay contacts 34 and a normally closed pair of contacts 36a of a selector switch 36. Output electrode or anode 38 of the SCR 32 is connected to relay coil 40. A direct current power supply in the form of a bridge rectifier 42 is connected to the series circuit including SCR 32 and relay winding 40. A capacitor 44 is connected across the output or direct-current terminals of the bridge rectifier.

SCR 32 is normally not conducting, and for this reason relay winding 40 is normally not energized. When the ground-leakage current rises sufficiently to be considered a fault, control electrode 30 triggers SCR 32, and current flows from the direct current supply 42 through the SCR to energize the relay. After SCR 32 fires in response to a signal exceeding the threshold of gate 30, the SCR continues to conduct and holds relay 40 energized. The relay thus remains energized to store the indication of an intermittent ground fault. Normally closed reset switch 41 is arranged in series with the relay and the SCR, to be operated manually when the apparatus is to be restored to its initial condition.

Bridge rectifier 42 is by design made of limited current capacity in relation to the resistance of relay winding 40. The resulting internal drop in rectifier 42 is such that relay 40 carries only a safe level of steady-state current, inadequate to overheat the relay. This amount of current would be inadequate to pull the relay in, initially. For this reason capacitor 44 is provided, this capacitor having a storage capacity that is charged to the peak output voltage of the bridge rectifier under no-load conditions; and when SCR 32 initially breaks down, a high current pulse flows as capacitor 44 discharges, thus supplying pull-in energy for the relay winding 40.

SCR 32 has a threshold below which it does not fire. At its firing level, relay 40 is energized, as described. This response may be adjusted to correspond to various ground-fault current levels, in order that the system shall not respond to normal and unavoidable ground currents that do not represent a fault. For this purpose, a selector switch 46 is provided together with a number of resistors 48, 50 and 52 that are connected to the respective contacts of selector switch 46. Depending upon the position of this selector switch, one of the resistors 48, 50 or 52 is connected as a load across secondary winding 24 and capacitor 26 in the normally-closed condition of contacts 34. Depending upon the position of selector switch 46, SCR 32 will fire at different levels of excitation in coil 24.

Relay 40 has a pair of normally closed contacts 54 arranged to complete a circuit for energizing contactor electromagnet 18. Selector switch 55 in series with relay contacts 54, can be moved from the solid line position as shown to the dotted line position, thereby bypassing contacts 54. A switch 57 is shown in series with electromagnet 18, for providing manual control for opening and closing contacts 16. It will be understood that conventional overload protection, control release and the like are contemplated for electromagnet 18 but are omitted as being unnecessary to an understanding of the present invention. When contacts 55 are in the solid-line position shown, contactor 16 opens automatically in response to detection of a ground fault. In the dotted-line position of switch 55 the apparatus signals the occurrence of a ground fault but the load remains in service.

Additionally normally closed relay contacts 58 connect a signal lamp 59 to terminals 56. Lamp 59 remains lit so long as relay 40 has not been energized, thus indicating normal conditions in line 10, free of ground-faults.

Relay 40 has normally open contacts 60 connected to an alarm 62. Relay 40 also has normally open contacts 64 for connecting selector switch 36 in the position illustrated to a circuit including current indicating instrument 66 having a series resistor 68. When the relay is energized in response to ground-fault level of leakage current, control electrode 30 and the selected load resistor 48, 50 or 52 are disconnected from the resonant winding-and-capacitor 24, 26, and the current indicating instrument 66 is connected to that resonant circuit.

In operation, the magnetic fluxes that are identified with the several conductors 10 in the alternating current line add vectorially and are completely self-neutralizing in the absence of any diverted ground-fault current, that is, current that does not pass along one of the conductors through core 22. Normally there is some minimal ground leakage current that is not regarded as a fault and the system is adjusted so that it does not respond to such normal ground leakage. Depending upon the normal leakage level, selector switch 46 is adjusted to connect one of the three resistors 48, 50 and 52 as a load across the resonant circuit 24, 26. With the selected resistor, the resonant circuit is loaded so that the threshold level of response of SCR 32 is not reached except when the normal ground leakage is exceeded and ground fault-current level is reached. When this occurs, SCR 32 fires and relay 40 is energized. The various normally open relay contacts close and the normally closed contacts open. With switch 55 in the position shown, contactor 16 opens and disconnects the load in response to ground-fault detection. Once SCR 32 is energized or fired it remains conducting and relay 40 remains energized, and contactor 16 remains open. With switch 55 in the dotted-line position, contactor 16 remains closed following detection of a ground fault, and when relay contacts 64 close, instrument 66 provides a reading of the ground-fault level.

It has been indicated above that the inclusion of capacitor 26 for resonating winding 24 is of considerable importance. To begin with, whenever a load is initially switched onto line 10, there is a momentary asymmetry in the currents drawn by the conductors 10. This switching transient might ordinarily be expected to produce a ground-fault indication in the signalling circuit. However, where the circuit is resonated as described, the switching-transient effect can be minimized. Indeed, it is reduced to the same order of magnitude as normal ground leakage effects.

A further advantage of the resonant circuit including winding 24 and capacitor 26 is that the amount of iron and the sheer bulk and expense of the transformer is greatly reduced and yet high sensitivity is maintained, as compared with a similar zero phase sequence transformer having no capacitor 26 across its secondary winding.

An indication of the magnitudes involved in a practical example of the foregoing apparatus may be of interest. Toroidal core, wound of grain oriented strip, has a cross section of ⅜" by ¾". The diameter of the toroidal core is anything that is appropriate to the conductors 10 that extend through the core. Secondary winding 24 in this example has 540 turns. Resistors 48, 50 and 52 are 4,000 ohms, 3,000 ohms and 1,000 ohms, respectively, and provide leakage-current sensitivities of 250 milliamperes, 350 milliamperes and 500 milliamperes. Sensitivities of as low as 100 milliamperes can be attained where winding 24 is resonated by capacitor 26, whereas switching transients would make prohibitive any adjustment of the sensitivity below 500 milliamperes in the absence of the resonating capacitor.

The leakage current can be accurately measured by switching selector switch 36 from the position indicated to its other position in which current indicator 66 is connected directly to the parallel resonant circuit 24, 26. A primary injection coil 72 on core 22 is provided for exciting the core with a measured level of current, and this provides a direct indication on instrument 66 used in calibrating this instrument. Thereafter readings of instrument 66 represent a direct reading of the unbalanced ground leakage current.

Naturally, the values of resistance chosen are such as to establish the desired voltage to fire SCR 32, at ground-fault levels of interest. SCR 32 may, for example, have a firing threshold of 0.4 volt impressed between its control or gate electrode 30 and its input electrode or cathode 28. With the winding 24 of 540 turns, a 6 microfarad capacitor 26 has been found highly effective in producing resonance at the 60 cycle power frequency of the supply line.

As further assurance that there shall be no triggering of SCR 32 in response to spurious high frequency spikes, a small capacitor 70 is connected across the control and input electrodes 30 and 28 of SCR 32. Capacitor 70 is ¼ microfarad in the example of values above, and is thus of only nominal influence on the size of capacitor 26.

Turning now to the relay 40 and its energizing supply, relay winding 40 in an example is 472 ohms drawing 45 milliamperes, in a nominal 24-volt coil. This is the steady-state condition. Supply 42 accordingly is designed to provide this current at about 20 to 24 volts. However, the peak voltage output of rectifier 42 is preferably of the order of 40 volts and a 250 microfarad capacitor 44 is then charged to the 40-volt level and is available to supply a positive pull-in pulse of current for the relay.

The ground leakage detector including the zero phase sequence transformer 20 and the detection circuit connected thereto is applicable to single phase and polyphase circuits. It has notable advantages when used for ground fault detection in grounded three-phase distribution systems. As a further feature, the ground leakage detector illustrated is adapted to fault detection on a three-phase undergrounded system by introducing a sensing neutral at the side of sensing transformer 20 that is remote from the monitored circuit or load. For this purpose, a network consisting of three equal Y-connected impedances 74 are connected to the distribution line 10 so that the transformer 20 is disposed between the load and the point at which the Y network is connected. The junction of the Y network is grounded. The impedances shown are resistors and are of relatively high values. Typically, the resistors are proportioned to draw one to two amperes, a sufficiently large current to exceed substantially the unbalance in currents resulting from the capacitance-to-ground of conductors 10 in the transmission line. When impedances 24 are added to an ungrounded system, it remains essentially ungrounded. Resistors 74 form no part of a load circuit except in the event of a ground fault.

Current sensing of a ground fault by means of the ground fault detector described becomes feasible in an ungrounded distribution system when the appropriate network 74 is provided. Where a complex transmission line is involved, transformer 20 may be located at any part of the entire system at the load side of network 74. The detector will then respond only to a fault still farther down the line.

The nature of the invention should not be misunderstood from the specific details and the specific values discussed above, all of this being provided to facilitate the practical application of the invention. As for example, the ground-fault detector described may be used both on grounded and ungrounded systems, and in both applications it provides a highly sensitive means of response to ground faults and thus tends to minimize the damage that may develop at the fault; its sensitivity can be made such as to save human life in some instances by tripping the controlled breaker before a fatal amount of electricity has passed through a body on accidental contact with a live part; and it is effective in tripping out on gradual deterioration of load resistance-to-ground or cable-resistance-to-ground before such a failure develops into a low resistance fault with ensuing severe damage. For even increased sensitivity in the case of lower-current loads, the half-turn primary windings represented by conductors 10 can be converted into multi-turn primary windings, as is well known in the art. Switch 46 and resistors 48, 50 and 52 may be replaced by components of other values and of other design for increasing the range of sensitivity control and for providing continuous control, as may be desired; and if desired, this sensitivity control and the device 30 which responds to signals above a threshold may be isolated by appropriate means interposed between the coil-and-capacitor combination 24, 26 and the terminal 34. Such interposed impedance would tend to reduce the sensitivity of the apparatus while at the same time avoiding imposition of such low resistance across the resonant coil-and-capacitor 24, 26 as to impair its resonant characteristic seriously.

Inasmuch as those skilled in the art will readily find varied application for the novel features of the invention, and inasmuch as still other modifications in the illustrated circuit will occur to those skilled in the art, this invention should be construed broadly in accordance with its full spirit and scope.

The embodiments of the invention in which an exclusive property or privilege is claimed are defined as follows:

1. A ground-fault detector comprising a zero phase sequence transformer including a toroidal core adapted to encircle all the conductors connecting an alternating power source to a load and a secondary winding on said core, fault-current indicating means connected to the terminals of said secondary winding, and a capacitor connected across said secondary winding and proportioned to resonate with the reactance of said secondary winding at the frequency of the alternating current supply for maintaining high sensitivity of the detector to ground faults while desensitizing the detector against response to switching transients, said fault-current responsive means including direct-current-operated means responsive to unbalance currents exceeding a certain threshold level connected to said secondary winding, a relay operated thereby, a direct-current power supply including rectifying means having alternating current input connections and having direct-current output connections connected in circuit with said relay and said direct-current operated means, said direct-current power supply having a high output voltage when free of load and a low voltage sufficient to hold said relay in under steady-state conditions, and a capacitor across said power supply having a capacitance effective to store relay pull-in energy at said high output voltage.

2. A ground-fault detector, comprising means for monitoring ground-fault current including a transformer having a secondary winding, fault-responsive means connected to said secondary winding and including switching means responsive to a predetermined level of current in said secondary winding, a relay connected to said switching means, fault-signalling means controlled by said relay, and an energizing source of current connected to said relay and said switching means, said energizing source including means providing a hold-in level of voltage for said relay under steady-state conditions and pull-in voltage under no-load conditions, and a storage capacitor across said supply proportioned to provide a pull-in current pulse for said relay upon operation of said switching means.

3. A ground-fault detector, comprising a zero phase sequence transformer having a toroidal core adapted to encircle all the conductors connecting an alternating current source to a load, a secondary winding on said core, fault-responsive means connected to said secondary winding and including switching means responsive to a predetermined level of current in said secondary winding, a relay connected to said switching means, fault-signalling means controlled by said relay, and an energizing source of current connected to said relay and said switching means, said energizing source including means providing a hold-in level of voltage for said relay under steady-state conditions and pull-in voltage under no-load conditions, and a storage capacitor across said supply proportioned to provide a pull-in current pulse for said relay upon operation of said switching means.

References Cited

UNITED STATES PATENTS

| | | | |
|---|---|---|---|
| 1,752,991 | 4/1930 | Kopeliowitsch et al. | 324—51 |
| 2,375,591 | 5/1945 | Schweitzer | 324—127 X |
| 3,019,373 | 1/1962 | Kramer | 317—27 X |
| 3,157,870 | 11/1964 | Mareno et al. | 324—133 X |
| 3,158,785 | 11/1964 | Cagniere et al. | 317—18 |
| 3,165,671 | 1/1965 | Mintz et al. | 317—27 |
| 3,202,875 | 8/1965 | Bateman | 317—27 X |
| 3,213,321 | 10/1965 | Dalziel | 317—27 XR |
| 3,252,052 | 5/1966 | Nash | 317—180 X |
| 3,300,650 | 1/1967 | Daien | 317—27 X |

FOREIGN PATENTS

| | | |
|---|---|---|
| 423,691 | 2/1935 | Great Britain. |
| 486,672 | 6/1938 | Great Britain. |
| 675,514 | 7/1952 | Great Britain. |
| 1,124,570 | 10/1956 | France. |
| 923,292 | 4/1963 | Great Britain. |

OTHER REFERENCES

Koranye, Current Monitoring Arrangement, IBM Technical Disclosure Bulletin, vol. 1, No. 2, August 1958, 324–127.

RUDOLPH V. ROLINEC, *Primary Examiner.*

WALTER L. CARLSON, *Examiner.*

G. R. STRECKER, *Assistant Examiner.*